(12) United States Patent
Dhawan (10) Patent No.: US 6,791,226 B1
(45) Date of Patent: Sep. 14, 2004

(54) MULTIPHASE MOTOR WINDING TOPOLOGY AND CONTROL

(75) Inventor: Rakesh Dhawan, Ashburn, VA (US)

(73) Assignee: Wavecrest Laboratories, LLC, Dulles, VA (US)

( * ) Notice: Subject to any disclaimer, the term of this patent is extended or adjusted under 35 U.S.C. 154(b) by 0 days.

(21) Appl. No.: 10/658,191

(22) Filed: Sep. 10, 2003

(51) Int. Cl.[7] .............................. H02P 7/00; H02K 29/00
(52) U.S. Cl. ....................... 310/184; 310/71; 310/179; 310/180; 310/254; 318/254
(58) Field of Search ........................ 310/71, 179, 180, 310/184, 195, 198, 156, 254; 318/254

(56) References Cited

U.S. PATENT DOCUMENTS

| 4,484,115 A | * | 11/1984 | Takahashi | 318/254 |
|---|---|---|---|---|
| 4,550,267 A | * | 10/1985 | Vaidya | 310/184 |
| 4,603,283 A | * | 7/1986 | Oltendorf | 318/254 |
| 4,896,063 A | * | 1/1990 | Roberts | 310/68 R |
| 5,164,623 A | * | 11/1992 | Shkondin | 310/67 R |
| 5,686,774 A | * | 11/1997 | Slavik et al. | 310/198 |
| 5,821,660 A | * | 10/1998 | Anderson | 310/184 |
| 5,918,360 A | * | 7/1999 | Forbes et al. | 29/596 |
| 6,034,493 A | * | 3/2000 | Boyd et al. | 318/254 |
| 6,326,748 B1 | * | 12/2001 | Moroto et al. | 318/254 |
| 6,384,496 B1 | * | 5/2002 | Pyntikov et al. | 310/68 B |

* cited by examiner

*Primary Examiner*—Burton Mullins
(74) *Attorney, Agent, or Firm*—McDermott Will & Emery LLP (57) ABSTRACT

A multiphase brushless permanent magnet motor has a stator provided with at least one winding for each phase, the windings permanently connected to each other at a plurality of junctions. A power source is coupled, via controlled motor energization circuitry, to a plurality of terminals connected to respective junctions, the number of which terminals is fewer than the number of motor phases. The motor energization circuitry is appropriately controlled by a central processor. A reduced number of controllable states is achieved while retaining a high degree of precision controllability. Thus, duplication of identical energization circuitry for each phase is avoided.

17 Claims, 8 Drawing Sheets

MULTIPHASE MOTOR WINDING TOPOLOGY AND CONTROL

RELATED APPLICATIONS

This application contains subject matter related to copending U.S. application Ser. No. 09/826,423 of Maslov et al., filed Apr. 5, 2001, copending U.S. application Ser. No. 09/826,422 of Maslov et al., filed Apr. 5, 2001, U.S. application Ser. No. 09/966,102, of Maslov et al., filed Oct. 1, 2001, U.S. application Ser. No. 09/993,596 of Pyntikov et al., filed Nov. 27, 2001, and application Ser. No. 10/173,610 of Maslov et al., filed Jun. 19, 2002, all commonly assigned with the present application. The disclosures of these applications are incorporated by reference herein.

FIELD OF THE INVENTION

The present invention relates to rotary electric motors, more particularly to winding circuit configurations for motors having a plurality of phases and the control of a multiphase motor using a minimum number of control states.

BACKGROUND

The above-identified copending patent applications describe the challenges of developing efficient electric motor drives for vehicles, as a viable alternative to combustion engines. Electronically controlled pulsed energization of windings of motors offers the prospect of more flexible management of motor characteristics. By control of pulse width, duty cycle, and switched application of a battery source to appropriate stator windings, superior functional versatility can be achieved. In many motor applications, a vehicle drive environment is but one example, it is highly desirable to attain smooth operation over a wide speed range, while maintaining a high torque output capability and conserving the power source.

Motor structural arrangements described in the identified copending applications contribute to these objectives. Electromagnet core segments may be configured as isolated magnetically permeable structures in an annular ring to provide increased flux concentration. Isolation of the electromagnet core segments permits individual concentration of flux in the magnetic cores, with a minimum of flux loss or deleterious transformer interference effects with other electromagnet members.

Figure 1:
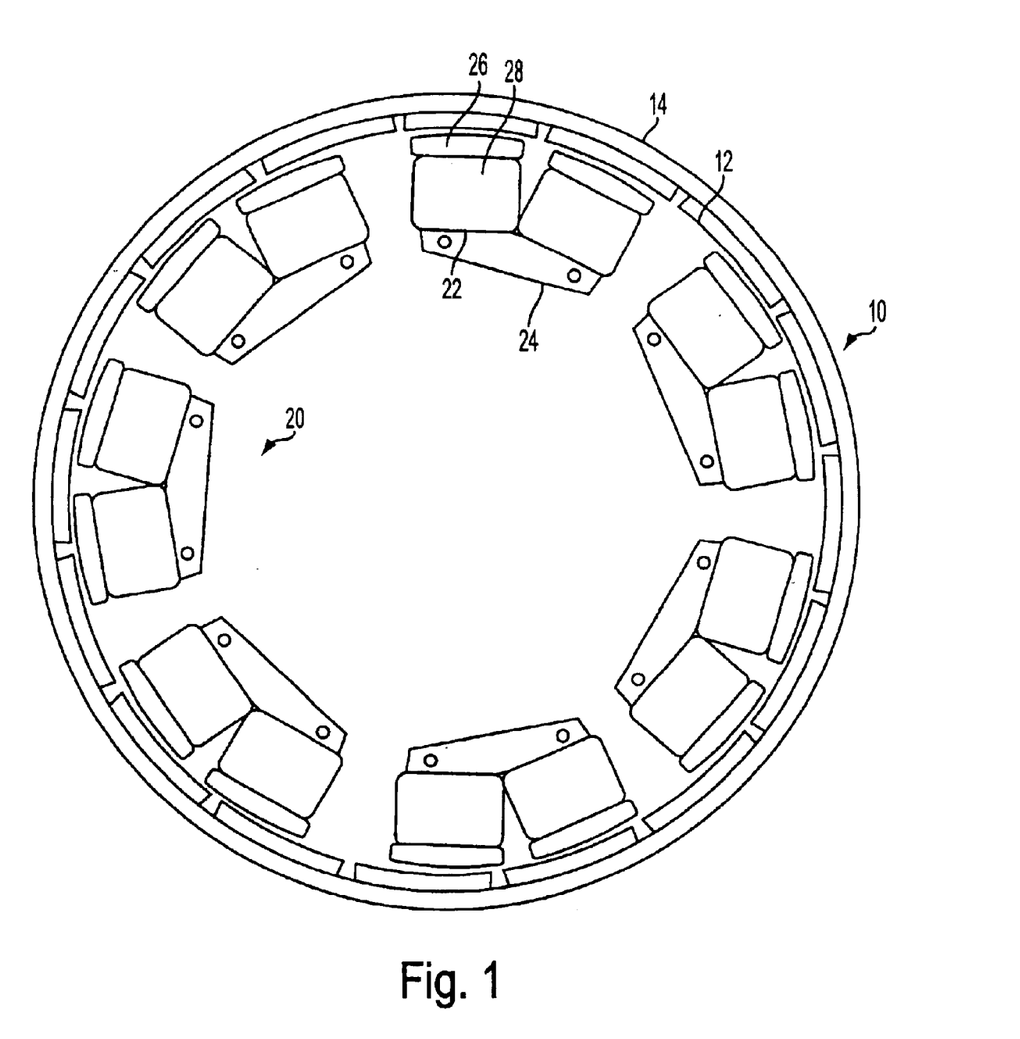
FIG. 1 is an exemplary view showing rotor and stator structural elements of a motor to which the present invention is applicable.

FIG. 1 is an exemplary view showing rotor and stator elements of a motor such as disclosed in the copending application Ser. No. 09/826,422, the disclosure of which has been incorporated herein. Rotor member 10 is an annular ring structure having permanent magnets 12 substantially evenly distributed along cylindrical back plate 14. The permanent magnets are rotor poles that alternate in magnetic polarity along the inner periphery of the annular ring. The back plate may comprise magnetically permeable material that serves as a magnetic return path between adjacent permanent magnetic poles 12. The rotor surrounds a stator member 20, the rotor and stator members being separated by an annular radial air gap. Stator 20 comprises a plurality of electromagnet core segments of uniform construction that are evenly distributed along the air gap. Each core segment comprises a generally u-shaped magnetic structure 24 that forms two poles having surfaces 26 facing the air gap. The legs of the pole pairs are wound with windings 28. Alternatively, the core segment may be constructed to accommodate a single winding formed on a portion linking the pole pair. Each stator electromagnet core structure is separate, and magnetically isolated, from adjacent stator core elements. The stator elements 24 are secured to a non magnetically permeable support structure (not illustrated), thereby forming an annular ring configuration. This configuration eliminates emanation of stray transformer flux effects from adjacent stator pole groups.

The above-identified application Ser. No. 10/173,610 describes motor control strategies contemplated for precise controlled performance for various applications of such motors. While typical control systems assume uniformity of parameter values over the entire motor, it is recognized in that application that provision of independent structural elements may cause variance of circuit parameters, such as phase resistance, phase self-inductance and the like, among the various stator elements. Motor control thus involves the fusion of nonlinear feedforward compensation coupled with current feedback elements. Each stator core segment is individually controlled as a separate phase, each set of phase windings energized in response to control signals generated by a controller in accordance with the set of control parameters associated with the stator phase component for the phase winding energized. In the exemplified seven phase motor illustrated, active control is required individually for all seven states.

Figure 2:
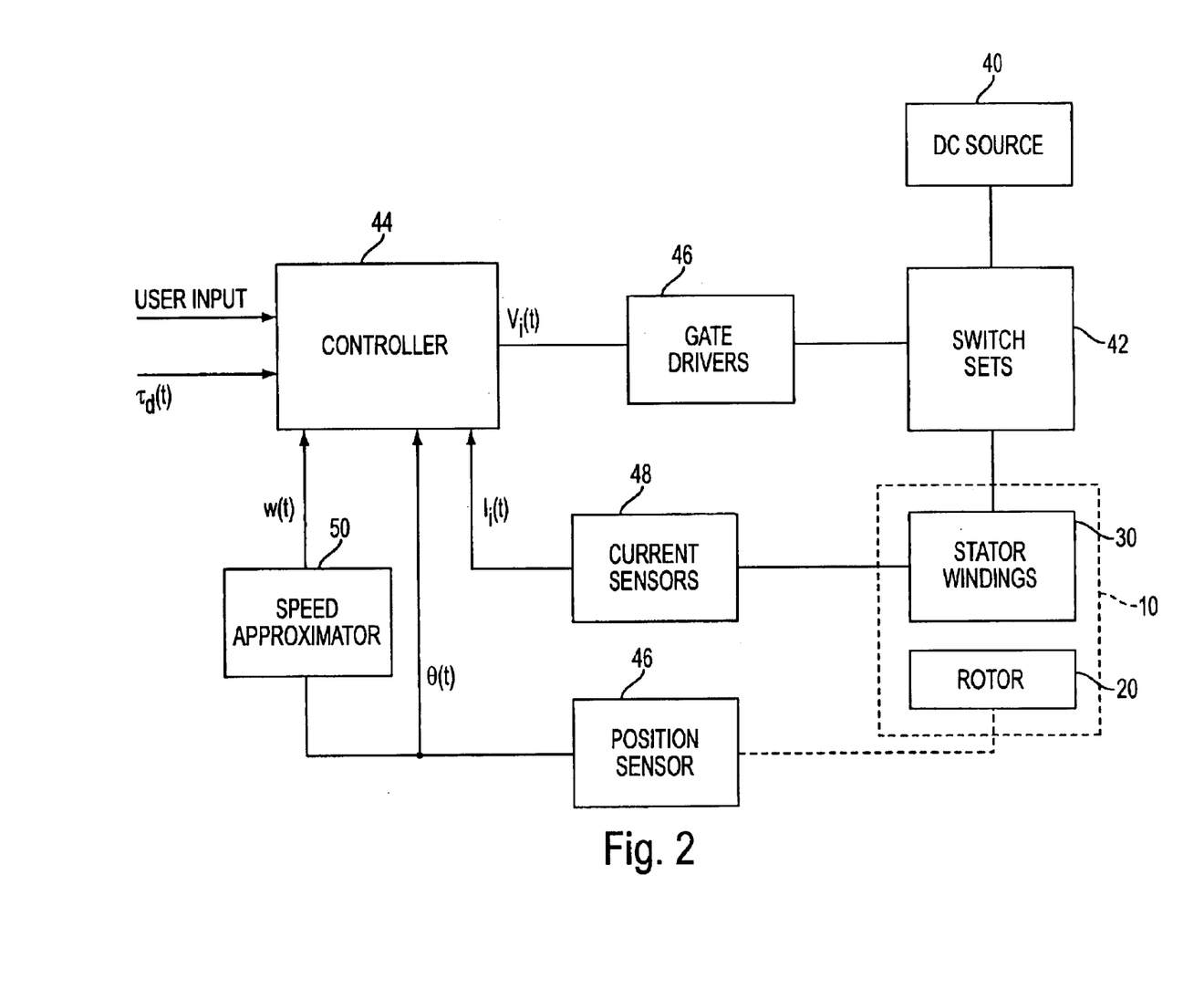
FIG. 2 is a block diagram of a motor control system such as disclosed in copending application Ser. No. 10/173,610.
Figure 3:
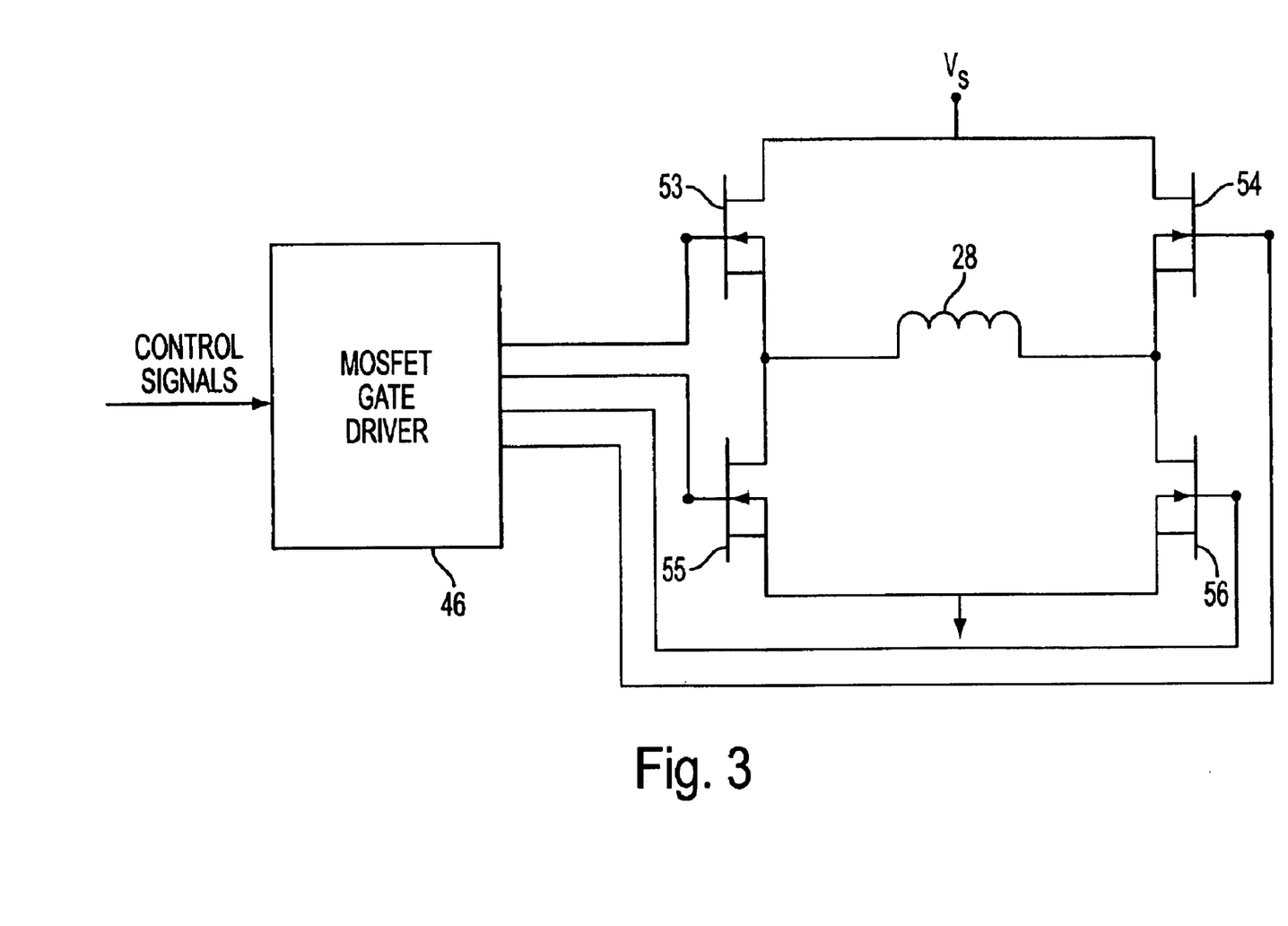
FIG. 3 is a partial circuit diagram of a switch set and driver for an individual stator core segment winding, such as disclosed in copending application Ser. No. 10/173,610.

Control according to application Ser. No. 10/173,610 is illustrated in FIGS. 2 and 3. The stator phase windings are switchably energized by driving current supplied from d-c power source 40 via electronic switch sets 42. The switch sets are coupled to controller 44 via gate drivers 46. Controller 44 has one or more user inputs and a plurality of inputs for motor conditions sensed during operation. Current in each phase winding is sensed by a respective one of a plurality of current sensors 48 whose outputs are provided to controller 44. The controller may have a plurality of inputs for this purpose or, in the alternative, signals from the current sensors may be multiplexed and connected to a single controller input. Rotor position sensor 46 is connected to another input of controller 44 to provide position signals thereto. The output of the position sensor is also applied to speed approximator 50, which converts the position signals to speed signals to be applied to another input of controller 44.

The sequence controller may comprise a microprocessor or equivalent microcontroller, such as Texas Instrument digital signal processor TMS320LF2407APG. The switch sets may comprise a plurality of MOSFET H-Bridges, such as International Rectifier IRFIZ48N-ND. The gate driver may comprise Intersil MOSFET gate driver HIP4082IB. The position sensor may comprise any known sensing means, such as a Hall effect devices (Allegro Microsystems 92B5308), giant magneto resistive (GMR) sensors, capacitive rotary sensors, reed switches, pulse wire sensors including amorphous sensors, resolvers, optical sensors and the like. Hall effect current sensors, such as F. W. Bell SM-15, may be utilized for currents sensors 48. The speed detector 50 provides an approximation of the time derivative of the sensed position signals.

FIG. 3 is a partial circuit diagram of a switch set and driver for an individual stator core segment winding. Stator phase winding 28 is connected in a bridge circuit of four FETs. Any of various known electronic switching elements may be used for directing driving current in the appropriate direction to stator winding 28 such as, for example, bipolar transistors. FET 53 and FET 55 are connected in series across the power source, as are FET 54 and FET 56. Stator winding 28 is connected between the connection nodes of the two series FET circuits. Gate driver 46 is responsive to control signals received from the sequence controller 44 to apply activation signals to the gate terminals of the FETs. FETs 53 and 56 are concurrently activated for motor current flow in one direction. For current flow in the reverse direction, FETs 54 and 55 are concurrently activated. Gate driver 46 alternatively may be integrated in sequence controller 44.

The particular circuitry shown and described above is merely representative of various alternative motor energization circuitry. However, each phase has associated switching and driver circuitry that permits active control of each phase state. For motors having a large number of phases, the duplication of such circuitry for each phase and the increased complexity of circuit real estate and functionality becomes expensive and burdensome. The need thus exists for effective control of a motor having a large number of phases while reducing the number or controllable states.

DISCLOSURE OF THE INVENTION

The present invention fulfills this need, while maintaining the benefits of the separated and ferromagnetically isolated individual stator core element configurations such as disclosed in the copending applications. A reduced number of controllable states is achieved while retaining a high degree of precision controllability.

Advantages are achieved with a multiphase brushless permanent magnet motor having a stator provided with at least one winding for each phase, the windings permanently connected to each other at a plurality of junctions. A power source is coupled, via controlled motor energization circuitry, to a plurality of terminals connected to respective junctions, the number of which terminals is fewer than the number of motor phases and, thus, the number of junctions. The motor energization circuitry is appropriately controlled by a central processor. Thus duplication of identical energization circuitry for each phase is avoided.

Such an arrangement can be obtained by configuring a first group of windings in a delta connected configuration, with adjacent windings of the configuration joined at a respective one of said junctions, and a second group of windings connected in a wye configuration, end points of the wye configuration joined to respective ones of said junctions. An end point of the wye configuration may be joined to a junction that is not directly connected to a terminal. As the invention is applicable to motors of various numbers of phases, the number of phase windings of the first group and second group is also variable. In a preferred illustrated embodiment, the motor comprises seven phases, the delta configuration comprises five of the phase windings with five junction points, the wye configuration comprises two of the phase windings, one leg of the wye being directly connected between one of the junctions and a center node to which the other wye windings are joined. In that embodiment, only four of the junction points are directly connected to respective power supply terminals. A first resistance element may be connected across the two phase windings of the wye configuration and a second resistance element may be connected between the center node of the wye configuration and one of the junctions.

The present invention is advantageous in a motor in which the stator further comprises a plurality of ferromagnetic core segments ferromagnetically isolated from each other, each core segment having a respective phase winding formed thereon. Each core segment comprises a plurality of poles, each pole facing the rotor across a radial air gap. The number of phases is equal to the number of stator cores and each phase winding is wound on a respective one of the stator cores. It is to be understood, however, that motors with a high number of stator core segments may have a plurality of core segment windings associated with respective phases.

A motor in accordance with the present invention may be under the control of motor energization circuitry that couples the stator windings to a source of power for supplying controlled energization current to the windings, the motor energization circuitry having a plurality of power output supply terminals fewer in number than the number of junctions. A central processor, coupled to the motor energization circuitry, performs appropriate control for motor winding energization. The motor energization circuitry may comprise a set of controlled switches connected to each power supply output terminal. Monitoring means are provided for monitoring the current in each of the plurality of stator phase windings and coupled to the central processor to provide current feedback signals.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF DRAWINGS

The present invention is illustrated by way of example, and not by way of limitation, in the figures of the accompanying drawing and in which like reference numerals refer to similar elements and in which.

DETAILED DESCRIPTION OF THE INVENTION

As described above, FIG. 1 is an example of a seven state machine, i.e., a seven phase brushless motor, each ferromagnetically isolated core segment having a winding formed thereon corresponding to a respective phase. Such a machine needs to be controlled actively in seven states for the respective seven phases. In accordance with the present invention, the phase windings are configured so that just four states need to be actively controlled to provide controlled stator winding energization for all seven phases. A significant reduction in the size and cost of the electronics can be realized as now a lesser amount of electronics is needed to achieve the same machine torque, speed and power attributes that would be obtained with individual active control of all seven states.

A current controlled brushless motor with seven equally distributed phases can be represented by the following seven current vectors:

$$I_a = |I| \cdot (1 + i0)$$
$$I_b = |I| \cdot (0.62 + i0.78)$$
$$I_c = |I| \cdot (-0.22 + i0.97)$$
$$I_d = |I| \cdot (-0.9 + i0.43)$$
$$I_e = |I| \cdot (-0.9 - i0.43)$$
$$I_f = |I| \cdot (-0.22 - i0.97)$$
$$I_g = |I| \cdot (0.62 - i0.78)$$

Or in a matrix form the following representation applies:

Vector $\vec{i}$ can be defined as:

$$\vec{i} = \begin{bmatrix} I_a \\ I_b \\ I_c \\ I_d \\ I_e \\ I_f \\ I_g \end{bmatrix} = |I| \cdot \begin{bmatrix} 1 \\ 0.62 \\ -0.22 \\ -0.9 \\ -0.9 \\ -0.22 \\ 0.62 \end{bmatrix} + i \begin{bmatrix} 0 \\ 0.78 \\ 0.97 \\ 0.43 \\ -0.43 \\ -0.97 \\ -0.78 \end{bmatrix}$$

A reduction to four states can be done with the following transformation:

$$\begin{bmatrix} I_1 \\ I_2 \\ I_3 \\ I_4 \end{bmatrix} = \begin{bmatrix} -1.0 & -1.0 & -1.0 & 1.0 & 0.0 & 1.0 & 1.0 \\ 1.0 & 1.0 & 0.0 & 0.0 & -1.0 & 0.0 & -1.0 \\ 0 & 0 & 0.0 & -1.0 & 1.0 & 0.0 & 0.0 \\ 0 & 0 & 1.0 & 0.0 & 0.0 & 1.0 & 0.0 \end{bmatrix} \cdot \begin{bmatrix} I_a \\ I_b \\ I_c \\ I_d \\ I_e \\ I_f \\ I_g \end{bmatrix}$$

The above matrix manipulation results in the following values of $I_1$, $I_2$, $I_3$ and $I_4$:

$$\begin{bmatrix} I_1 \\ I_2 \\ I_3 \\ I_4 \end{bmatrix} = |I| \cdot \begin{bmatrix} -1.9 - i3.08 \\ 1.9 + i2 \\ -i0.87 \\ 1.95i \end{bmatrix}$$

or in a polar form the above currents can be represented as follows:

$$\begin{bmatrix} I_1 \\ I_2 \\ I_3 \\ I_4 \end{bmatrix} = |I| \cdot \begin{bmatrix} 3.62 \cdot e^{j(-121.7)} \\ 2.76 \cdot e^{j(46.4)} \\ 0.87 \cdot e^{j(-90)} \\ 1.95 \cdot e^{j(90)} \end{bmatrix}$$

Figure 4:
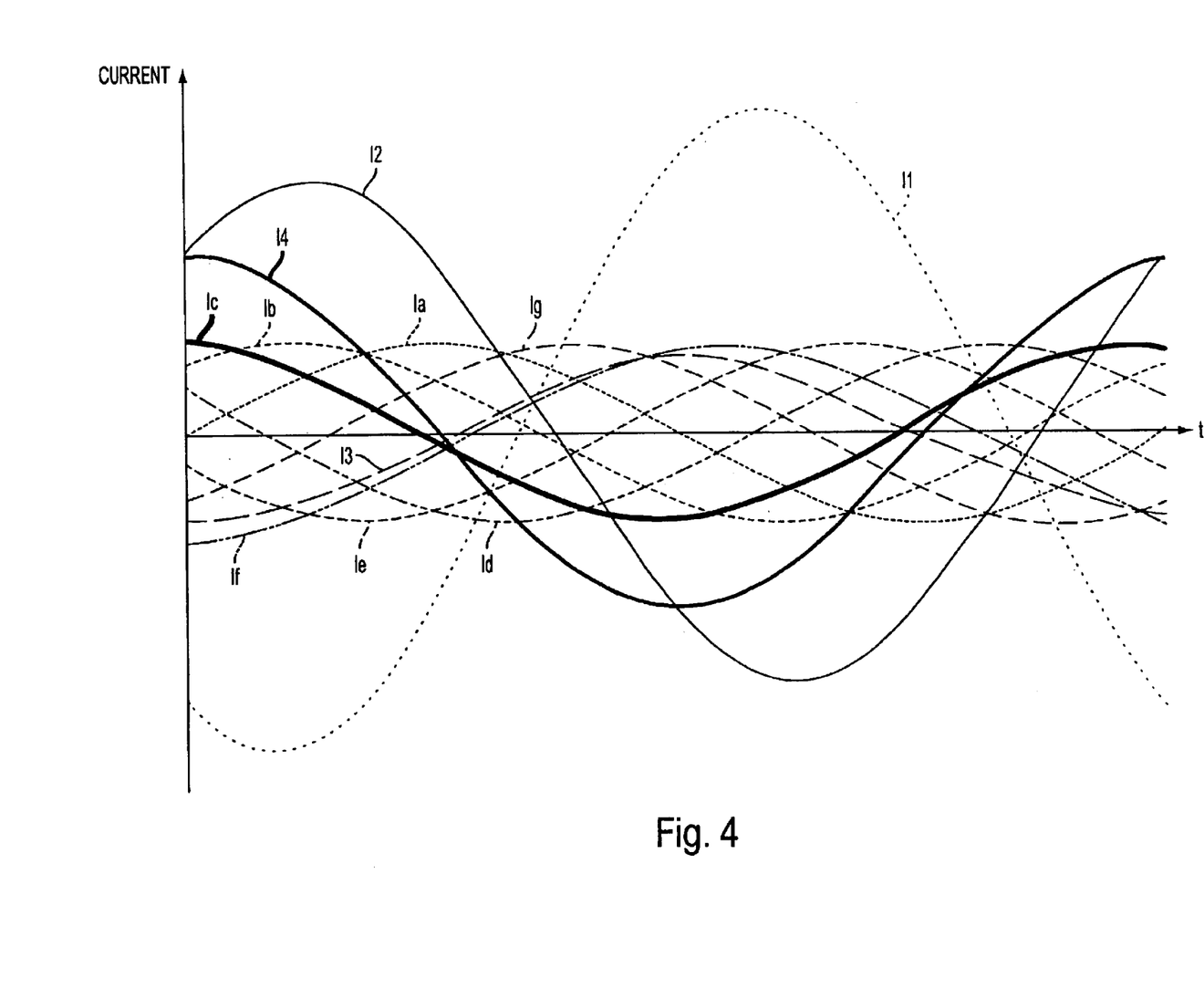
FIG. 4 is a timing diagram of various current waveforms in the present invention.
Figure 5:
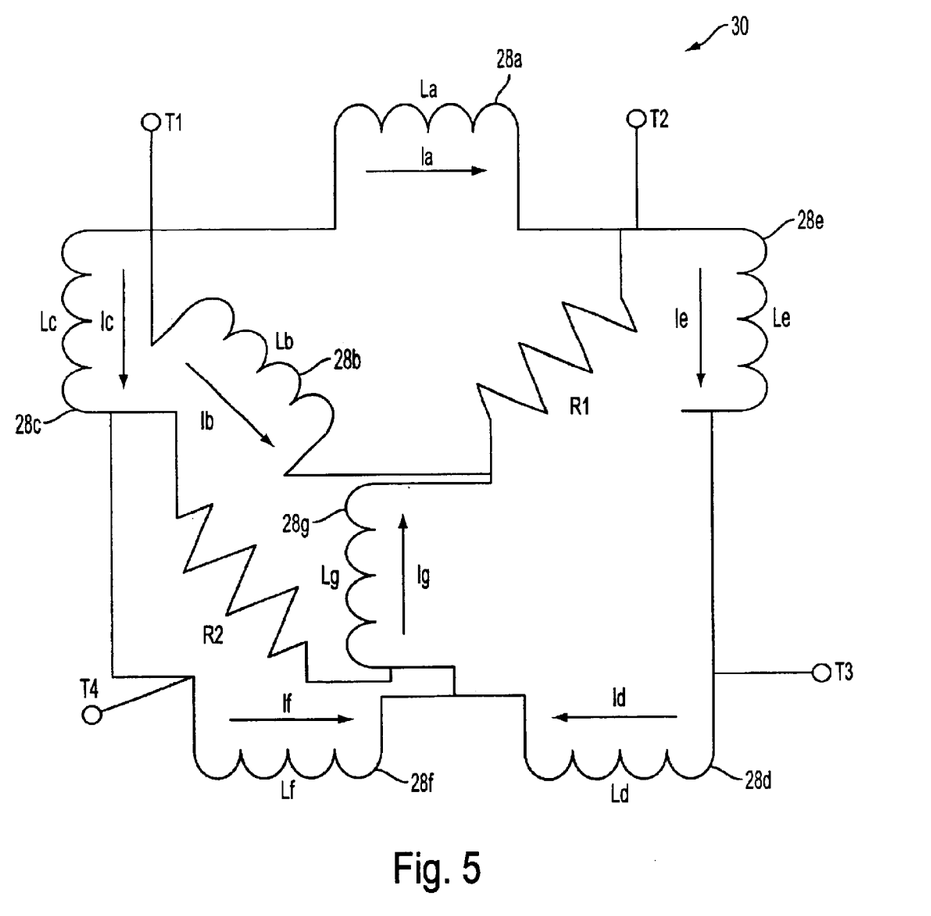
FIG. 5 is a circuit diagram illustrating a stator winding circuit configuration for an exemplified embodiment of the present invention representing a seven phase motor.

FIG. 4 is a timing diagram illustrating the current waveforms for the seven phase currents superimposed with the current waveforms for the four state currents. FIG. 5 is a circuit configuration of the seven phase windings 28a–28g by which the seven balanced phase currents whose waveforms are illustrated in FIG. 4 are obtained by application of the four state current waveforms shown. Five phase windings 28a, 28e, 28d, 28f and 28c are permanently connected in series at five junctions to form a delta configuration. Phase windings 28b and 28g are part of wye configuration that is permanently connected to respective junctions between phase windings of the delta configuration. An end of each phase winding 28b and 28g is connected together at a central node. The other ends of phase windings 28b and 28g are connected, respectively, to the junction between phase winding 28a and phase winding 28c and the junction between phase winding 28d and phase winding 28f. The central node is connected to the junction between phase winding 28a and phase winding 28e via resistance element R1. Resistance element R2 is shown connected between the outer end of phase winding 28g and the junction between phase windings 28c and 28f. The resistance elements are provided to eliminate or reduce any circulating current(s) which may exist because of interaction between the windings. R1 and R2 values can be set to conform with the desired machine performance and, in many instances, can be eliminated. In the latter case the central node is directly connected to the delta junction. Power supply terminals $T_1$–$T_4$ are coupled to four of the five junctions of the delta configuration to supply the four state currents $I_1$–$I_4$ whose waveforms are illustrated in FIG. 4. Control of the motor supply to provide those state currents will produce the balanced phase current waveforms illustrated.

Figure 6:
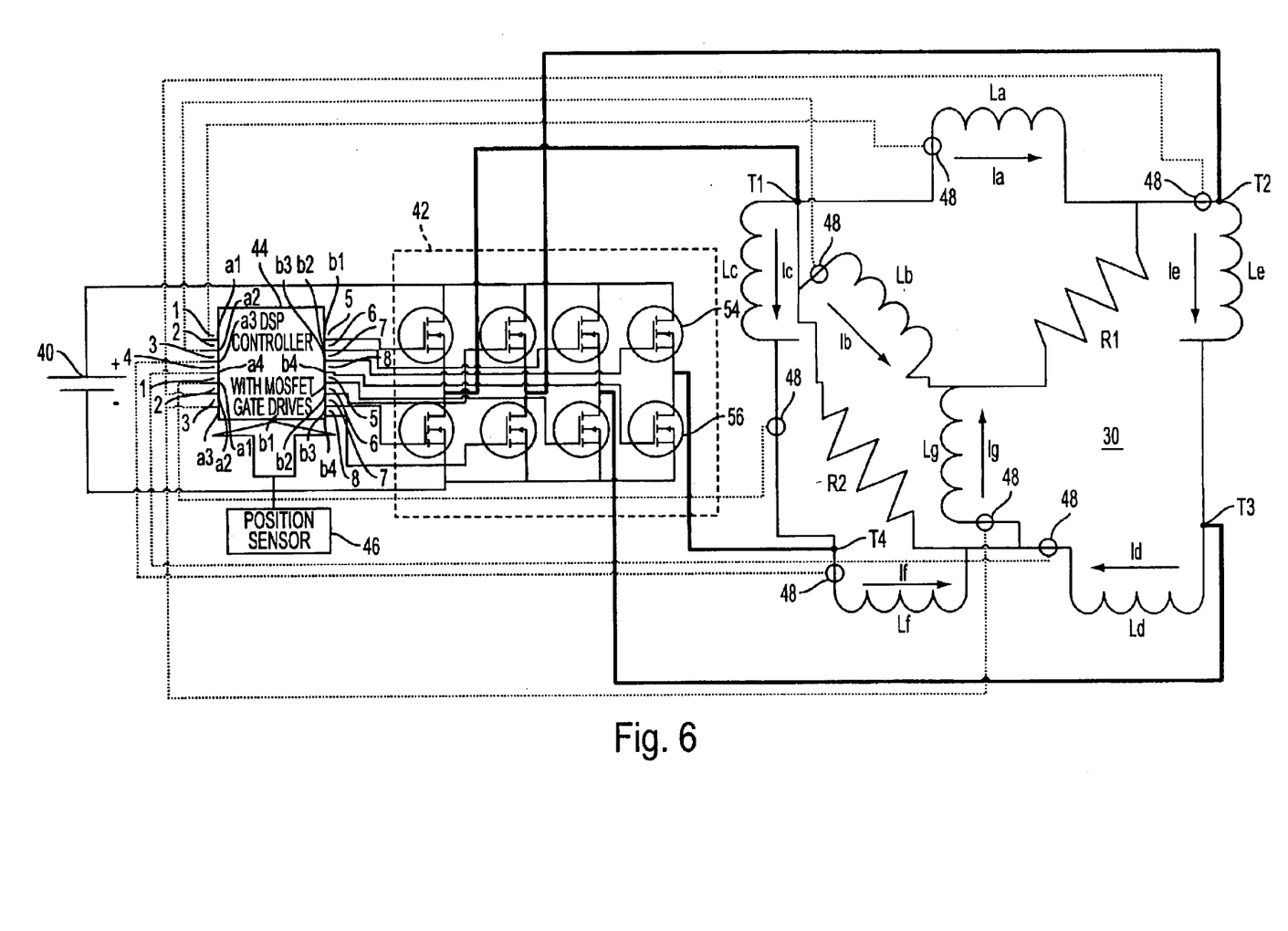
FIG. 6 is a diagram of the embodiment of FIG. 5 incorporated in a motor control system in accordance with the present invention.

A motor control system for energization of the phase windings of the stator configuration of FIG. 5 is shown in FIG. 6. To avoid unnecessary confusion of illustration, only those elements necessary for understanding of the invention are shown in detail. The motor stator is powered from DC source 40 via motor energization circuitry 42. Preferably, energization circuitry 42 comprises pairs of switches connected in parallel across the power source. Each switch pair comprises an upper MOSFET switch 54 connected in series with a lower MOSFET switch 56. The number of pairs of switches is equal to the number of controlled power output connections to the motor windings, four in the illustrated embodiment. The junction between each series connected switch pair is connected to a respective one of power supply terminals $T_1$–$T_4$. Gate electrodes are connected to controller 44 and are individually activated by control signals output by the controller. A current sensor 48 is located in each phase winding path to provide current feedback signals to the controller.

Controller 44, position sensor 46 and the current sensors may comprise elements as disclosed in the aforementioned application Ser. No. 10/173,610. As described in that application, the motor feedback signals received by the controller provide sufficient data to carry out algorithms for outputting control signals to the switch set supplying energization to each phase winding. In the system of FIG. 6, the controller outputs control signals to the four pairs of switches in response to the current monitored in all seven phase windings. In accordance with the matrix transformations set forth above, the controller obtains equivalent feedback for the currents in the four output power connections and thus provides control signals to the switches. The present invention thus significantly reduces required switches and associated circuitry from twenty eight (four for each phase) to eight. Additional efficiency in circuitry is obtained in the reduction in the number of gate drivers.

Figure 7:
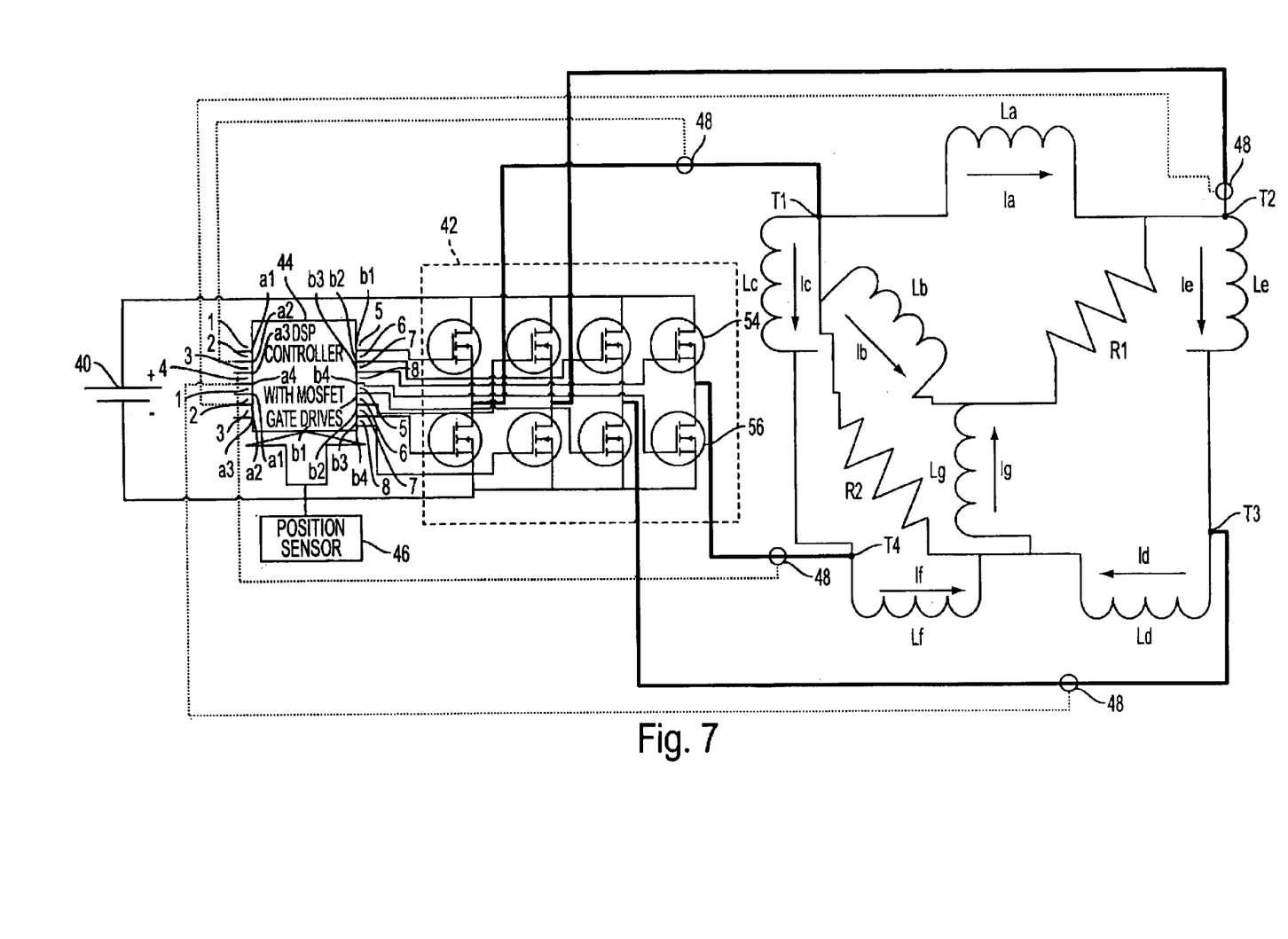
FIG. 7 illustrates a modification of the diagram of FIG. 6 in accordance with the present invention.
Figure 8:
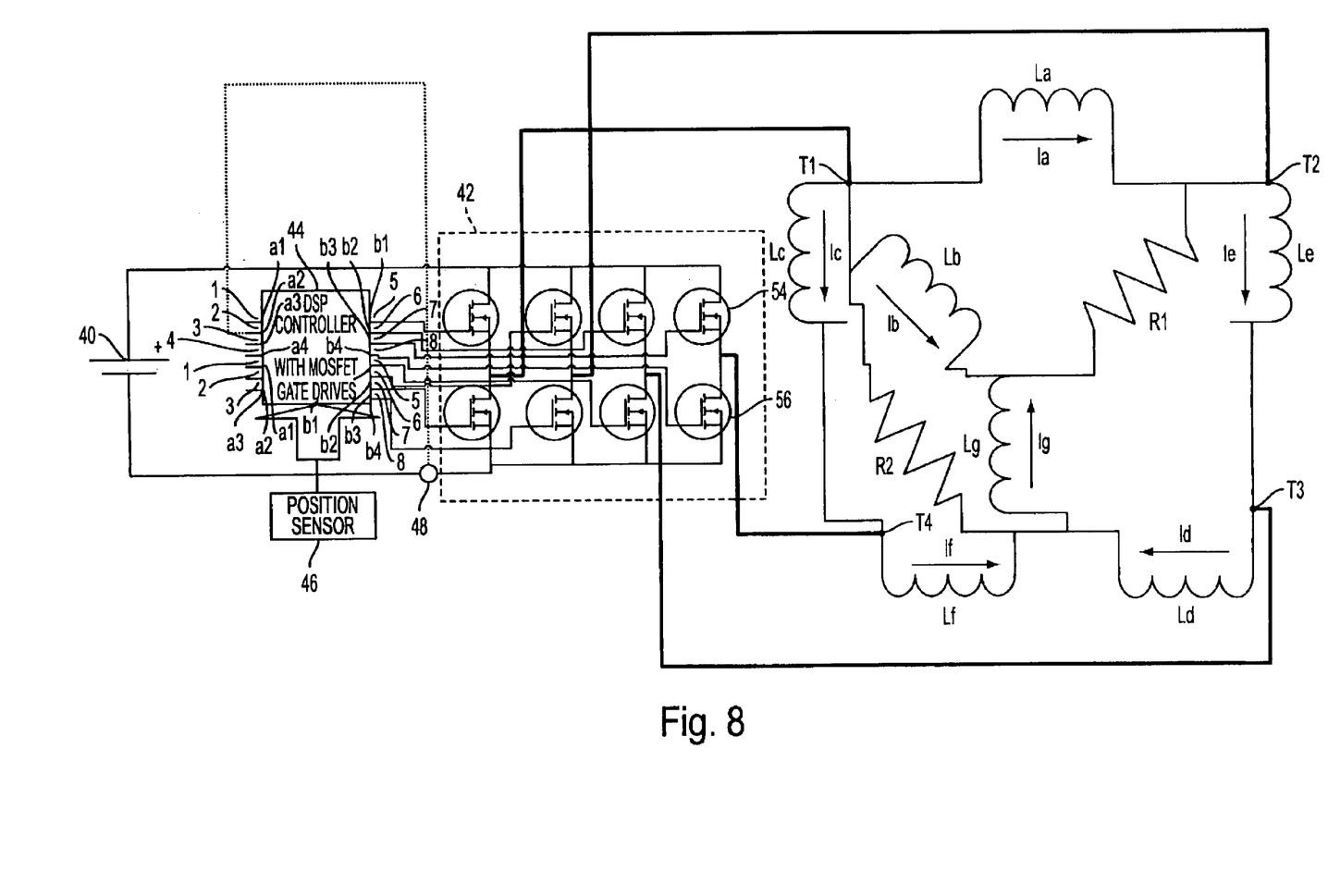
FIG. 8 illustrates another modification of the diagram of FIG. 6 in accordance with the present invention.

FIGS. 7 and 8 depict modifications of the embodiment of FIG. 6 and differ therefrom in the number and placement of current sensors. In the embodiment of FIG. 7, a current sensor 48 is connected in each power output connection to the corresponding switch set. The four sensed current signals are transmitted to respective inputs of the controller. In the embodiment of FIG. 8, a single current sensor 48 is connected in one of the battery leads. The sensed battery current is input to the controller. In these embodiments, appropriate algorithms, based on the matrices described above, are stored in the controller for outputting control signals to the switch set supplying energization to each phase winding.

As can be appreciated, the motor of the invention can be utilized in a wide range of structural configurations. Although a seven phase motor has been exemplified and illustrated, the invention is not limited to a specific number of phases as appropriate phase current vectors and transformations can be derived. With motors having a greater number of phases, additional savings can be realized. In addition, the invention does not require that each phase winding be formed on a single stator core segment pole pair. That is, the invention is also applicable to multiphase motors having phase windings distributed about a plurality of poles.

What is claimed is:

1. A multiphase brushless electric motor comprising:
   a rotor comprising a plurality of permanent magnets;
   a stator comprising a plurality of windings, each winding corresponding to a respective motor phase, the plurality of windings permanently connected to each other at a plurality of junctions; and
   a plurality of terminals coupled to a controlled power source;
   wherein the plurality of terminals are fewer in number than the number of motor phases, and each terminal is directly connected to a respective single one of said junctions.

2. A multiphase brushless electric motor as recited in claim 1, wherein the number of terminals is fewer than the number of junctions.

3. A multiphase brushless electric motor as recited in claim 1, wherein the plurality of windings comprise:
   a first group of windings connected in a delta configuration, adjacent windings of the configuration joined at a respective one of said junctions; and
   a second group of windings connected in a wye configuration, end points of the wye configuration joined to respective ones of said junctions.

4. A multiphase brushless electric motor as recited in claim 3, wherein one of said junctions, which is connected to an end point of the wye configuration, is not directly connected to a terminal.

5. A multiphase brushless electric motor as recited in claim 3, wherein the motor comprises seven phases, the delta configuration comprises five of the phase windings with five junction points, the wye configuration comprises two of the phase windings, and only four of the junction points are directly connected to respective terminals.

6. A multiphase brushless electric motor as recited in claim 5, further comprising a first resistance element connected across one of the phase windings of the delta configuration and a second resistance element connected between a center node of the wye configuration and one of the junctions.

7. A multiphase brushless electric motor as recited in claim 1, wherein the stator further comprises a plurality of ferromagnetic core segments ferromagnetically isolated from each other, each core segment having a respective phase winding formed thereon.

8. A multiphase brushless motor as recited in claim 7, wherein each core segment comprises a plurality of poles, each pole facing the rotor across an air gap.

9. A multiphase brushless motor as recited in claim 7, wherein the number of phases is equal to the number of stator cores and each phase winding is wound on a respective one of the stator cores.

10. A multiphase brushless electric motor system comprising:
    a motor comprising a permanent magnet rotor and a stator comprising a plurality of windings, each winding corresponding to a respective motor phase, the plurality of windings permanently connected to each other at a plurality of junctions;
    motor energization circuitry coupling the stator windings to a source of power for supplying controlled energization current to the windings, the motor energization circuitry having a plurality of power supply output terminals fewer in number than the number of junctions; and
    a central processor coupled to and controlling the motor energization circuitry; wherein each said power supply output terminal is directly connected to a respective single one of said junctions.

11. A multiphase brushless electric motor as recited in claim 10, wherein the plurality of windings comprise;
    a first group of windings connected in a delta configuration, adjacent windings of the configuration joined at a respective one of said junctions; and
    a second group of windings connected in a wye configuration, end points of the wye configuration joined to respective ones of said junctions.

12. A multiphase brushless electric motor as recited in claim 11, wherein the motor comprises seven phases, the delta configuration comprises five of the phase windings with five junction points, the wye configuration comprises two of the phase windings, and only four of the junction points are directly connected to respective terminals, whereby the seven phase motor is controlled with four controllable power outputs.

13. A multiphase brushless electric motor as recited in claim 11, wherein the stator further comprises a plurality of ferromagnetic core segments ferromagnetically isolated from each other, each core segment having a respective phase winding formed thereon.

14. A multiphase brushless electric motor as recited in claim 11, wherein said motor energization circuitry comprises a set of controlled switches connected to each power supply output terminal.

15. A multiphase brushless electric motor as recited in claim 11, further comprising monitoring means for monitoring the current in each of the plurality of stator phase windings, the monitoring means coupled to the central processor to provide current feedback signals thereto.

16. A multiphase brushless electric motor as recited in claim 12, further comprising a current monitor connected to each of the energization circuitry power supply output terminals and coupled to the central processor to provide current feedback signals thereto.

17. A multiphase brushless electric motor as recited in claim 11, further comprising a current monitor connected in series with the battery coupled to the central processor to provide current feedback signals thereto.

* * * * *